(12) United States Patent
Barbu et al.

(10) Patent No.: US 12,170,585 B2
(45) Date of Patent: Dec. 17, 2024

(54) PROCESSING SIGNALS

(71) Applicant: NOKIA TECHNOLOGIES OY, Espoo (FI)

(72) Inventors: Oana-Elena Barbu, Aalborg (DK); Benny Vejlgaard, Gistrup (DK); Johannes Harrebek, Aalborg (DK); Ryan Keating, Chicago, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/060,919

(22) Filed: Dec. 1, 2022

(65) Prior Publication Data

US 2023/0179447 A1 Jun. 8, 2023

(30) Foreign Application Priority Data

Dec. 2, 2021 (FI) ..................... 20216236

(51) Int. Cl.
*H04L 5/12* (2006.01)
*H04L 25/02* (2006.01)
*H04W 64/00* (2009.01)

(52) U.S. Cl.
CPC ....... *H04L 25/0212* (2013.01); *H04W 64/003* (2013.01)

(58) Field of Classification Search
CPC ............ H04L 25/0212; H04L 25/0224; H04L 25/03834; H04L 5/0094; H04L 27/261;
(Continued)

(56) References Cited

U.S. PATENT DOCUMENTS

| 6,269,131 B1 | 7/2001 | Gothe et al. |
| 2015/0003542 A1* | 1/2015 | Barbu ............... H04L 5/0048 375/260 |

(Continued)

FOREIGN PATENT DOCUMENTS

WO  WO 2021/187962 A1  9/2021

OTHER PUBLICATIONS

"3rd Generation Partnership Project; Technical Specification Group Radio Access Network; NR; Physical layer measurements (Release 16)", 3GPP TS 38.215 v16.4.0, (Dec. 2020), 25 pages.

(Continued)

*Primary Examiner* — Helene E Tayong
(74) *Attorney, Agent, or Firm* — ALSTON & BIRD LLP (57) ABSTRACT

To increase positioning accuracy, channel characteristics are determined taking into account receive filter response and transmit filter response. For example, upon receiving assistance data for positioning an apparatus, a transmit sequence is generated using the assistance data; and a combination of the transmit sequence is generated by combining the transmit sequence. Further, a receive filter response is determined, a transmit filter response is obtained, and a combined filter response is generated using the receive filter response and the transmit filter response. Reference signals received over a channel are measured by sampling them into a plurality of time-domain samples, and the channel is estimated from the plurality of time-domain samples using the combined filter response and the combination of the transmit sequence. Then, per channel characteristics, a value of the channel characteristics based on the channel estimated is determined.

20 Claims, 3 Drawing Sheets

(58) Field of Classification Search
CPC ...... H04W 64/003; H04W 64/00; H04B 1/38; G01S 11/02; G01S 1/0428
USPC ........................................................ 375/262
See application file for complete search history.

(56) References Cited

U.S. PATENT DOCUMENTS

| | | | |
|---|---|---|---|
| 2017/0295558 A1* | 10/2017 | Amizur | H04L 25/0226 |
| 2020/0212955 A1* | 7/2020 | Raghupathy | H04W 4/02 |
| 2020/0333424 A1 | 10/2020 | Shi et al. | |
| 2021/0067382 A1 | 3/2021 | Manolakos et al. | |
| 2022/0158662 A1 | 5/2022 | Vejlgaard et al. | |

OTHER PUBLICATIONS

"3rd Generation Partnership Project; Technical Specification Group Radio Access Network; NR; Physical layer procedures for data (Release 16)", 3GPP TS 38.214 v16.7.0, (Sep. 2021), 172 pages.

"3rd Generation Partnership Project; Technical Specification Group Radio Access Network; Study on channel model for frequencies from 0.5 to 100 GHz (Release 16)", 3GPP TR 38.901 v16.1.0, (Dec. 2019), 101 pages.

"3rd Generation Partnership Project; Technical Specification Group Services and System Aspects; Service requirements for the 5G system; Stage 1 (Release 18)", 3GPP TS 22.261 v18.4.0, (Sep. 2021), 107 pages.

"3rd Generation Partnership Project; Technical Specification Group Services and System Aspects; Study on Communication for Automation in Vertical Domains (Release 16)", 3GPP TR 22.804 v16.3.0, (Jul. 2020), 197 pages.

Catt et al., "New WID on NR Positioning Enhancements", 3GPP TSG RAN Meeting #90e, RP-202900, (Dec. 7-11, 2020), 5 pages.

Extended European Search Report for European Application No. 22209792.5 dated Apr. 13, 2023, 11 pages.

Office Action for Finland Application No. 20216236 dated Jun. 7, 2022, 7 pages.

Qualcomm Incorporated, "New SID on NR Positioning Enhancements", 3GPP TSG RAN Meeting #86, RP-193237, (Dec. 9-12, 2019), 4 pages.

* cited by examiner

PROCESSING SIGNALS

CROSS-REFERENCE TO RELATED APPLICATIONS

This application claims priority to Finnish Patent Application No. 20216236, filed Dec. 2, 2021, the entire contents of which are incorporated herein by reference.

TECHNICAL FIELD

Various example embodiments relate to wireless communications.

BACKGROUND

Wireless communication systems are under constant development. New applications, use cases and industry verticals are to be envisaged with accurate positioning performance requirements. To position a user terminal, uplink and/or downlink reference signals are transmitted and measured. The more accurate positioning is needed the more factors need to be taken into account.

BRIEF DESCRIPTION

According to an aspect there is provided an apparatus comprising at least one processor; and at least one memory including computer program code, the at least one memory and computer program code being configured to, with the at least one processor, cause the apparatus at least to perform: receiving assistance data for positioning the apparatus, the assistance data indicating reference signals to be measured and at least one channel characteristics whose value is to be determined for positioning; generating, using the assistance data, a transmit sequence; generating a combination of the transmit sequence by combining the transmit sequence; determining a receive filter response; obtaining a transmit filter response; generating a combined filter response using the receive filter response and the transmit filter response; measuring reference signals received over a channel by sampling them into a plurality of time-domain samples; estimating the channel from the plurality of time-domain samples using the combined filter response and the combination of the transmit sequence; and determining, per a channel characteristics of the at least one channel characteristics, a value of the channel characteristics based on the channel estimated.

In an embodiment, the at least one memory and computer program code are configured to, with the at least one processor, cause the apparatus further to at least to perform: obtaining the transmit filter response by receiving its parameterization in the assistance data.

In an embodiment, the at least one memory and computer program code are configured to, with the at least one processor, cause the apparatus further to at least to perform: obtaining the transmit filter response by approximating the transmit filter response using a predetermined pulse-shaping.

In an embodiment, the at least one memory and computer program code are configured to, with the at least one processor, cause the apparatus further to at least to perform: causing transmitting information on capability to approximate the transmit filter response to an apparatus wherefrom the assistance data is received.

In an embodiment, the information is transmitted using a radio resource control connected flag.

In an embodiment, the at least one memory and computer program code are configured to, with the at least one processor, cause the apparatus further to at least to perform: causing transmitting a parametrization of the transmit filter response to an apparatus wherefrom the assistance data is received.

In embodiments, the combination of the transmit sequence is a combination of the transmit sequence matrix, the combined filter response is a combined filter response matrix, and the at least one memory and computer program code are configured to, with the at least one processor, cause the apparatus further to at least to perform: generating a projection matrix from the combination of the transmit sequence matrix and the combined filter response matrix; mapping the time-domain samples to delay domain channel impulse responses using the projection matrix; and estimating the channel by using the delay domain channel impulse responses, the combined filter response matrix and the combination of the transmit sequence matrix.

In embodiments, the at least one memory and computer program code are configured to, with the at least one processor, cause the apparatus further to at least to perform: receiving the assistance data from a location management point; and causing transmitting the value to the location management point.

In embodiments, the at least one channel characteristics comprises time of arrival and/or angle of arrival, and/or relative time of arrival.

In embodiments, the apparatus is a transmission-reception point or a terminal device.

According to an aspect there is provided a method comprising: receiving assistance data for positioning an apparatus, the assistance data indicating reference signals to be measured and at least one channel characteristics whose value is to be determined for positioning; generating, using the assistance data, a transmit sequence; generating a combination of the transmit sequence by combining the transmit sequence; determining a receive filter response; obtaining a transmit response; generating a combined filter response using the receive filter response and the transmit filter response; measuring reference signals received over a channel by sampling them into a plurality of time-domain samples; estimating the channel from the plurality of time-domain samples using the combined filter response and the combination of the transmit sequence; and determining, per a channel characteristics of the at least one channel characteristics, a value of the channel characteristics based on the channel estimated.

According to an aspect there is provided a computer readable medium comprising program instructions for causing an apparatus to perform at least the following: generating, using assistance data received for positioning an apparatus, the assistance data indicating reference signals to be measured and at least one channel characteristics whose value is to be determined for positioning, a transmit sequence; generating a combination of the transmit sequence by combining the transmit sequence; determining a receive filter response; obtaining a transmit filter response; generating a combined filter response using the receive filter response and the transmit filter response; measuring reference signals received over a channel by sampling them into a plurality of time-domain samples; estimating the channel from the plurality of time-domain samples using the combined filter response and the combination of the transmit sequence; and determining, per a channel characteristics of the at least one channel characteristics, a value of the channel characteristics based on the channel estimated.

In an embodiment, the computer readable medium is a non-transitory computer readable medium.

According to an aspect there is provided a computer program comprising instructions for causing an apparatus to perform at least the following: generating, using assistance data received for positioning an apparatus, the assistance data indicating reference signals to be measured and at least one channel characteristics whose value is to be determined for positioning, a transmit sequence; generating a combination of the transmit sequence by autocorrelating the transmit sequence; determining a receive filter response; obtaining a transmit filter response; generating a combined filter response using the receive filter response and the transmit filter response; measuring reference signals received over a channel by sampling them into a plurality of time-domain samples; estimating the channel from the plurality of time-domain samples using the combined filter response and the combination of the transmit sequence; and determining, per a channel characteristics of the at least one channel characteristics, a value of the channel characteristics based on the channel estimated.

According to an aspect there is provided a computer program comprising instructions which, when the program is executed by an apparatus, cause the apparatus to perform at least the following: generating, using assistance data received for positioning an apparatus, the assistance data indicating reference signals to be measured and at least one channel characteristics whose value is to be determined for positioning, a transmit sequence; generating a combination of the transmit sequence by combining the transmit sequence; determining a receive filter response; obtaining a transmit filter response; generating a combined filter response using the receive filter response and the transmit filter response; measuring reference signals received over a channel by sampling them into a plurality of time-domain samples; estimating the channel from the plurality of time-domain samples using the combined filter response and the combination of the transmit sequence; and determining, per a channel characteristics of the at least one channel characteristics, a value of the channel characteristics based on the channel estimated.

According to an aspect there is provided a system comprising: at least one location management point configured to transmit assistance data for positioning, the assistance data indicating reference signals to be measured and at least one channel characteristics whose value is to be determined for positioning; at least one first apparatus configured to transmit the reference signals; at least one second apparatus to be positioned, a second apparatus being configured to: generate, using received assistance data, a transmit sequence; generate a combination of the transmit sequence by combining the transmit sequence; determine a receive filter response; obtain a transmit filter response; generate a combined filter response using the receive filter response and the transmit filter response; measure reference signals received over a channel by sampling them into a plurality of time-domain samples; estimate the channel from the plurality of time-domain samples using the combined filter response and the combination of the transmit sequence; and determine, per a channel characteristics of the at least one channel characteristics, a value of the channel characteristics based on the channel estimated.

In an embodiment, at least one of the at least one second apparatus is further configured to obtain the transmit filter response by approximating the transmit filter response using a predetermined pulse-shaping, and to transmit information on capability to approximate the transmit filter response to at least one of the at least one location management point; and the at least one location management point is configured to use the information to determine whether or not to include transmit filter parametrization in the assistance data to be transmitted.

According to an aspect there is provided an apparatus comprising means for performing: generating, using assistance data received for positioning an apparatus, the assistance data indicating reference signals to be measured and at least one channel characteristics whose value is to be determined for positioning, a transmit sequence; generating a combination of the transmit sequence by autocorrelating the transmit sequence; determining a receive filter response; obtaining a transmit filter response; generating a combined filter response using the receive filter response and the transmit filter response; measuring reference signals received over a channel by sampling them into a plurality of time-domain samples; estimating the channel from the plurality of time-domain samples using the combined filter response and the combination of the transmit sequence; and determining, per a channel characteristics of the at least one channel characteristics, a value of the channel characteristics based on the channel estimated.

According to an aspect there is provided a system comprising means for performing: generating, using assistance data received for positioning an apparatus, the assistance data indicating reference signals to be measured and at least one channel characteristics whose value is to be determined for positioning, a transmit sequence; generating a combination of the transmit sequence by autocorrelating the transmit sequence; determining a receive filter response; obtaining a transmit filter response; generating a combined filter response using the receive filter response and the transmit filter response; measuring reference signals received over a channel by sampling them into a plurality of time-domain samples; estimating the channel from the plurality of time-domain samples using the combined filter response and the combination of the transmit sequence; and determining, per a channel characteristics of the at least one channel characteristics, a value of the channel characteristics based on the channel estimated.

BRIEF DESCRIPTION OF DRAWINGS

Embodiments are described below, by way of example only, with reference to the accompanying drawings, in which.

DETAILED DESCRIPTION OF SOME EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned. Further, although terms including ordinal numbers, such as "first", "second", etc., may be used for describing various elements, the structural elements are not restricted by the terms. The terms are used merely for the purpose of distinguishing an element from other elements. For example, a first signal could be termed a second signal, and similarly, a second signal could be also termed a first signal without departing from the scope of the present disclosure.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. The embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultrawideband (UWB) technology, sensor networks, mobile ad-hoc networks (MANETs) and Internet Protocol multimedia subsystems (IMS) or any combination thereof.

Figure 1:
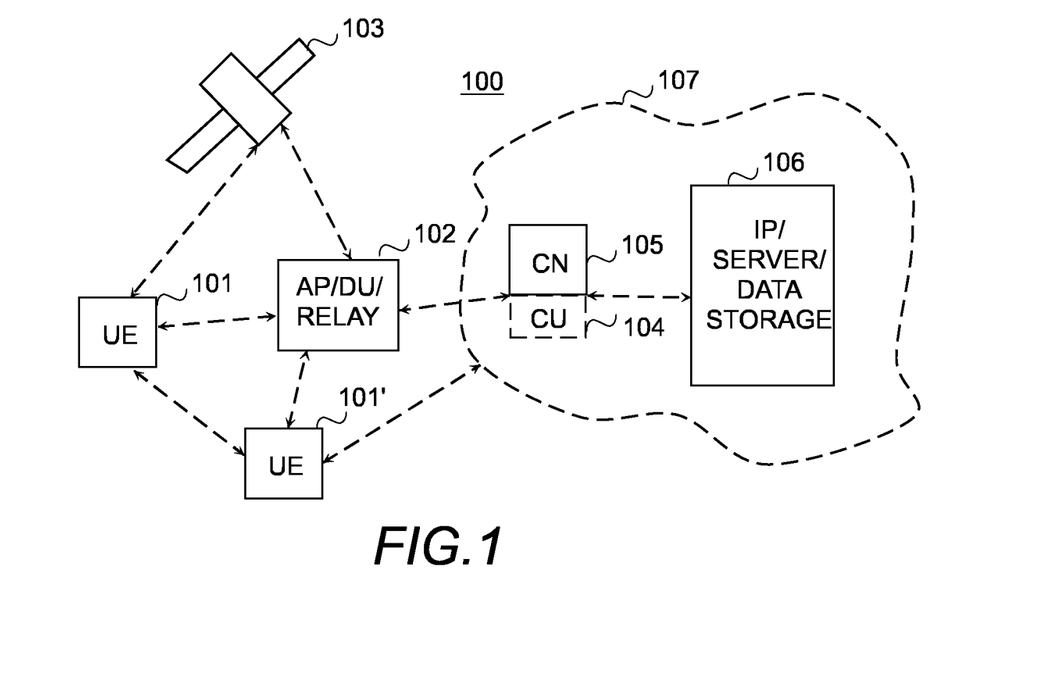
FIG. 1 illustrates an exemplified wireless communication system.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system 100 given as an example but a person skilled in the art may apply the solution to other communication systems provided with necessary properties.

The example of FIG. 1 shows a part of an exemplifying radio access network.

FIG. 1 shows user devices 101, 101' configured to be in a wireless connection on one or more communication channels with a node 102. The node 102 is further connected to a core network 105. In one example, the node 102 may be an access node such as (e/g)NodeB providing or serving devices in a cell. In one example, the node 102 may be a non-3GPP access node. The physical link from a device to a (e/g)NodeB is called uplink or reverse link and the physical link from the (e/g)NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 105 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), or access and mobility management function (AMF), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a device (e.g. a portable or non-portable computing device) that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The user device may also utilise cloud. In some applications, a user device may comprise a user portable device with radio parts (such as a watch, earphones, eyeglasses, other wearable accessories or wearables) and the computation is carried out in the cloud. The device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors micro-controllers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave, below 6 GHz—cmWave—mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 106, or utilise services provided by them. The communication network may also be able to support the usage of cloud services, for example at least part of core network operations may be carried out as a cloud service (this is depicted in FIG. 1 by "cloud" 107). The communication system may also comprise a central control entity, or a like, providing facilities for networks of different operators to cooperate for example in spectrum sharing.

The technology of Edge cloud may be brought into a radio access network (RAN) by utilizing network function virtualization (NVF) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 102) and non-real time functions being carried out in a centralized manner (in a centralized unit, CU 104).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 103 in the mega-constellation may cover several satellite-enabled network entities that create on-ground cells. The on-ground cells may be created through an on-ground relay node 102 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

In 5G and beyond, it is envisaged that use of smart devices, that may move, will increase thereby posing different latency and accuracy requirements for positioning the smart devices in connected robotics and autonomous systems, for example. A non-limiting list of examples of such services and/or corresponding mobile smart devices include unmanned mobility with fully autonomous connected vehicles, other vehicle-to-everything (V2X) services, or smart industry with different Industrial Internet of Things (IIoT) devices, such as automated guided vehicles or mobile robots or mobile robot arms. Naturally, for positioning of terminal devices, like smart phones or smart wearable devices, including different smart accessories, or other user devices, different latency and accuracy requirements for positioning them may also be posed. Below term terminal device is used to cover all kind of devices that can be positioned, and/or that contain movable parts that can be positioned, including the above listed examples of user devices and smart devices, without limiting terminal devices to the listed examples.

Figure 2:
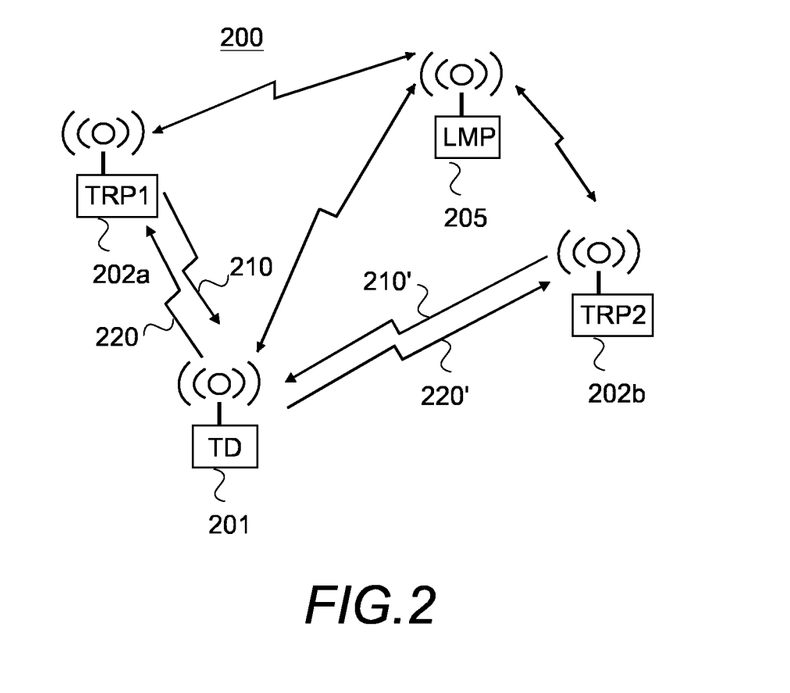
FIG. 2 illustrates an exemplified radio access network positioning architecture.

FIG. 2 provides a highly simplified example of a positioning architecture disclosing operational entities to determine a position of a mobile device, called herein a terminal device.

Referring to FIG. 2, the system 200 comprises, for positioning a terminal device (TD) 201, a plurality of apparatuses 202a, 202b configured to act as a transmission-reception point (TRP) and an apparatus 205 configured to determine a position of the terminal device. It should be appreciated that other apparatuses may be involved in the information exchange, for example information may pass via them, but for the sake of clarity they are not described in more detail herein.

The terminal device 201 is a device that may move and/or contain movable parts and is configured to communicate with a radio access network. Different examples of the terminal device 201 have been described above.

An apparatus 202a, 202b configured to act as a transmission-reception point, called herein a transmission-reception point, may be a base station or an access node, or an operational entity comprising one or more antennas in a base station, or an operational entity comprising one or more remote radio heads, or a remote antenna of a base station, or any other set of geographically co-located antennas forming one operational entity, for example an antenna array with one or more antenna elements, for one cell in the radio access network, or for a part of the one cell. In other words, one cell may include one or multiple transmission points, and cells in the radio access network comprise transmission-reception points.

A terminal device's position may be estimated based on measurements performed by the terminal device on signal transmissions (e.g. reference signal transmissions) 210, 210' received from one or more transmission-reception points, i.e. based on downlink measurements, and/or by measurements performed by transmission-reception points on signal transmissions 220, 220' received from the user device, i.e. based on uplink measurements.

In 5G and beyond, it is envisaged that a terminal device's position, called a target device, is estimated by a core network element called a location management function, LMF. The LMF manages positioning for the target device by obtaining measurements and other location information from one or more positioning units, i.e. from the terminal device 201 and/or the transmission-reception points 202a, 202b, and by providing assistance data to the positioning units to help determine what to measure and report. However, at least part of the location management function may be distributed to be performed at the radio access network, or even in terminal devices. Hence, herein a term location management point (LMP) is used to cover all above listed possibilities. In other words, the term location management point covers any apparatus 205, including any node or server or device or entity, configured to act as the location management point to determine (estimate, compute) positions of one or more terminal devices. The details how the terminal devices are finally positioned, after measurements are performed and values to report or use for positioning are determined, are not relevant for the implementations described herein, and hence there is no need to describe them in more detail herein.

A positioning unit, be that the terminal device or the transmission-reception point, receives assistance data from the location management point. The assistance data indicates, for example, configuration(s) of the reference signals, e.g. positioning reference signals, and measurements to be performed. The assistance data may further comprise other information used for positioning, such as the location information of transmission-reception points that will send or receive reference signals. The configuration information in the assistance data may indicate time-frequency resources, etc.

A reference signal, when transmitted, passes through a bandpass filter (a transmit filter, or a transmit pulse-shaping filter) in the transmitting apparatus, travels over a wireless channel with an impulse response, is bandpass filtered by a receive filter (a bandpass filter, or a receive pulse-shaping filter) in a receiving apparatus, the result of which is a received reference signal.

$$y(t)=(\phi * h) * u)(t)+\epsilon(t) \quad (1)$$

wherein
y(t) is the received signal,
φ is a combined filter response, see equation 2
h is the impulse response of the channel,
u is the reference signal,
* denotes convolution,
ε is additive white gaussian noise In the above example, the combined filter response 4) is the convolution of the transmit filter and the receive filter:

$$\phi(t)=(p_r * p_t), \operatorname{supp}(\phi)=[0, L_r + L_t] \quad (2)$$

wherein
$p_r$ is the receive filter response,
$p_t$ is the transmit filter response,
$L_r$ is the length of the receive filter response,
$L_t$ is the length of the transmit filter response.

To position the terminal device with an accuracy of centimetres the one or more values to measure or report should be determined from a channel over which the reference signal is received, without the combined filter response. Using the below described principles it is possible to increase positioning accuracy even in noisy environments, for example from two-three meters below one meter.

Figure 3:
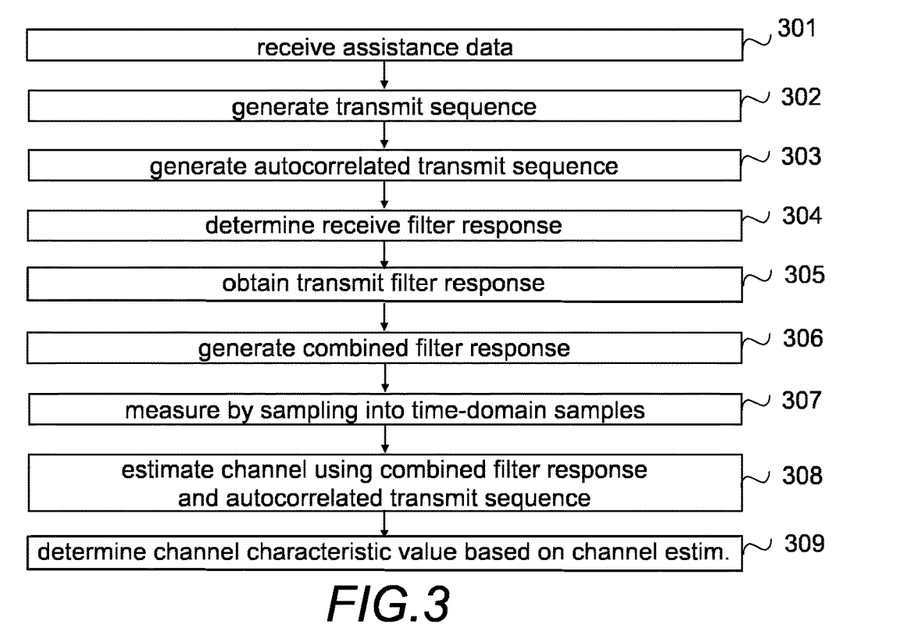
FIGS. 3 and 4 are flow charts illustrating example functionalities.

FIG. 3 illustrates an example how to process the received reference signals to values of characteristics, using time of arrival as a characteristics to measure for positioning, without limiting the example to said characteristics. It is a straightforward measure for one skilled in the art to implement the described principles to other channel characteristics for positioning, for example to angle of arrival and/or relative time of arrival.

Referring to FIG. 3, assistance data is received in block 301 from the location management point. The assistance data indicates at least configuration(s) of the reference signals, e.g. positioning reference signals, and measurements to be performed. In the illustrated example the measurements to be performed indicate that a value of time of arrival is to be measured.

Based on the configurations of the reference signals, a transmit sequence is generated in block 302 and an autocorrelation of the transmit sequence is generated in block 303, by autocorrelating the transmit sequence generated in block 302. It should be appreciated that the autocorrelation and autocorrelating are used herein as a non-limiting example of a combination of the transmit sequence (combined transmit sequence) generated by combining the transmit sequence itself. For example, the combination may be an equalization generated by combining the transmit sequence with a corresponding received signal. The transmit sequence u may be expressed as:

$$u=[u_1, \ldots, u_N] \quad (3)$$

wherein 1 to N is the length of the transmit sequence, i.e. the number of samples in the transmit sequence.

The samples represent samples are pulse-shaped with the transmit filter, i.e. samples that have passed through a pulse-shaping transmit filter but not yet being modulated.

Further, a receive filter response is determined in block 304 by computing the receive filter response using the receive filter values in the apparatus, known by the apparatus comprising the receive filter. In addition, a transmit filter response is obtained in block 305. Depending on an implementation, the transmit filter response may be obtained by receiving it in the assistance data or by the apparatus approximating the transmit filter response, for example as will be described with FIG. 5.

A combined filter response is generated in block 306 by convolving the receive filter response and the transmit filter response, using the equation 2 described above. The combined filter response g(t) may be expressed using equation 4:

$$g(t) = (\phi * h)(t) = \sum_l h_l \phi(t - \tau_l),\ supp(g) = [0, L_r + L_t + \tau_L] \quad (4)$$

wherein
l=1:L multipath components (number of multipath components)
$\tau_l$ is a delay vector (ordered in ascending order)

It should be appreciated that instead of convolving the responses (impulse responses), the combined filter response may be generated by multiplying transmit filter frequency response and receive filter frequency response. The frequency responses may be determined/obtained using the same assumption discussed above.

The functionality in blocks 302 to 306 may be called an input preparation, which will be followed by reconstruction of a channel (a propagation channel) in blocks 307 and 308.

When reference signals are received (not separately illustrated) they are measured by sampling them in block 307 into time-domain samples. For example, a received signal y that is sampled at a rate $T_s$ yields samples according to equation 5, or if expressed based on combined filter response, i.e. using equation 4, samples will be collected to a vector g according to equation 6:

$$y[n] = y(nT_s),\ n = 0: N-1 \quad (5)$$

$$g = [g(T_s), \ldots, g(kT_s), \ldots, g(KT_s)]^T,\ K = \left\lceil \frac{L_r + L_t + \tau_L}{T_s} \right\rceil \quad (6)$$

The channel is then estimated in block 308 using the combined filter response and the autocorrelation of the transmit sequence.

For example, by denoting the combined filter response g as follows:

$$g = \Phi h \quad (7),$$

wherein
$h=[h_1, \ldots, h_L]^T$ collects the channel taps complex gains, and
$\Phi \in R^{K \times L}$, $\Phi[k,l] = \phi(kT_s - \tau_l)$.

When equation 1 is rewritten to be equation 8, and the collected samples are expressed using equation 9, the channel may be estimated using equation 10.

$$y(t) = (g*u)(t) + \epsilon(t) = \Sigma_k g_k u(t-kT_s) + \epsilon(t) \quad (8)$$

$$y = [y_1, \ldots, y_N]^T = Ug + \epsilon = U\Phi h + \epsilon \quad (9),$$

wherein matrix $U \in R^{N \times K}$, $U(n,k) = u((n-k)T_s)$ $$z(dT_s) = z_d = \sum_{n=d}^{d+N-1} y_n u_{n-d} \approx \sum_{k=1}^{K} g_k \gamma((d-k)T_s) + \xi_d, \quad (10)$$

wherein
z is a vector of post-processed signal samples,
γ is the autocorrelation of the transmit sequence u,
d is $d^{th}$ entry in the autocorrelation of the transmit sequence u,
$\xi_d$ is the noise vector Following approximations and assumptions are made for the equation 10:
Equation 9 has been approximated by assuming that the delays of the channel impulse response are on a grid, i.e.

$$\tau_l \approx \frac{lT_s}{o_f},$$

where $o_f$ sets the resolution of the grid and may be interpreted as an oversampling factor.

The grid is expanded to a maximum delay, e.g. multiple integers of cyclic prefix, CP, duration, i.e. the delay vector $\tau_L = PL_{cp}T_s$, $L=PL_{cp}$, $P \geq 1$, wherein $L_{cp}T_s$ is the length of the cyclic prefix in the transmit sequence and P is an integer value defining maximum delay search space. The maximum delay may have a fixed value, or a configurable value.

The length of the receive filter response is assumed to be $L_r = RT_s$, and the length of the transmit filter response is assumed to be $L_t = TT_s$ which yields K=R+T+L.

In other words, the samples in (9) are cross-correlated with the generated transmit sequence $u=[u_1, \ldots, u_N]$ to yield z=y*u, with $d^{th}$ entry being approximated by equation 10, which when expressed in matrix-vector notation becomes equation 11:

$$z \approx \Gamma g + \xi = \Gamma \Phi h + \xi \quad (11),$$

wherein the matrix $\Gamma \in R^{N \times K}$, $\Gamma(n,k) = \gamma((N-K)T_s)$.

A value of the at least one channel characteristics, i.e. in the example the value of the time of arrival, is then determined in block 309 based on the thus obtained estimation of channel propagation, i.e. based on equation 11. The time of arrival may be determined to be an estimate of the time of arrival, using the strongest detected channel tap, estimated using the equation 11.

For example, using the equation 11, index j of a sampled delay for which the channel tap $h_j$ has the largest magnitude needs to be determined.

In one implementation, it is assumed that the wireless channel comprises few multipath components resulting that few channel taps are expected to contain relevant power. Hence a sparsity inducing prior probability density function for the channel taps and a maximum aposteriori problem may be used. For example, Laplace probability density function may be used as the sparsity inducing prior may be used, yielding to an optimization problem of equation 12:

$$\hat{h} = \arg\min \|z - \Gamma\Phi h\|_2^2 + \lambda\|h\|_1 \quad (12)$$

wherein
$\hat{h}$=estimated channel impulse response vector
$\lambda$=sparsity parameter, $\lambda \geq 0$.

The estimated channel impulse may be computed using, for example, a pre-selected least absolute shrinkage and selection operator (LASSO) estimator, to solve h in the equation 12. Naturally other estimators may be used as well.

A power of a channel tap h, $p_h$, may be computed using equation 13, the index j may be selected by computing equation 14, and finally the time of arrival, TOA, may be determined by computing equation 15.

$$p_h = |\hat{h}| \quad (13)$$

$$j = \arg\max_{k \in [0, PL_{cp}]} \{p_h(k)\} \quad (14)$$

$$TOA = \frac{jT_s}{o_f} \quad (15)$$

Figure 4:
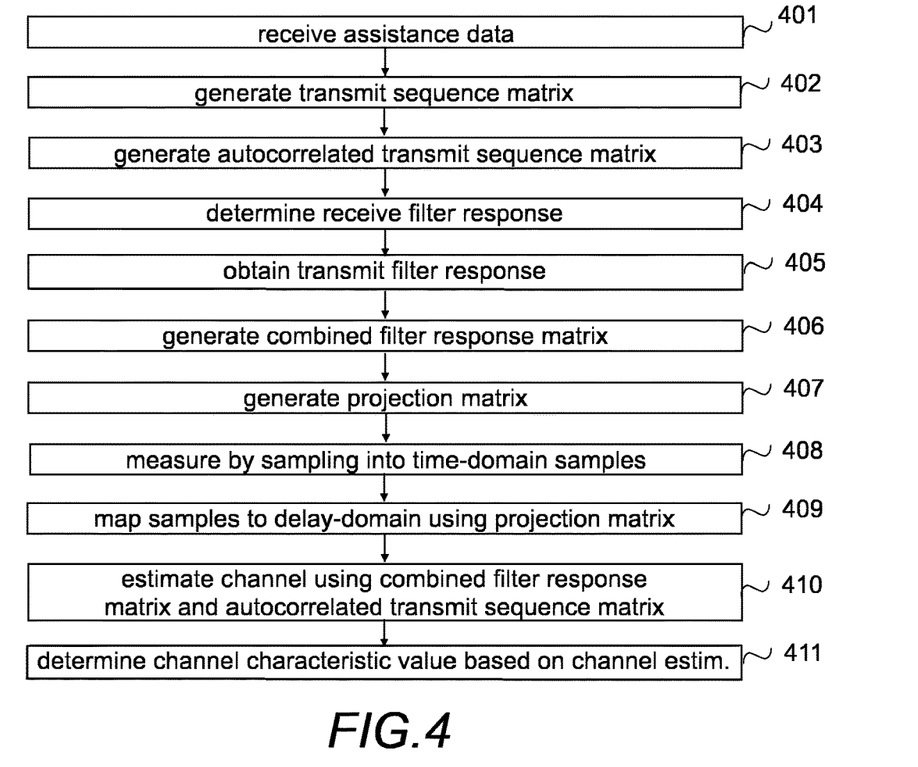

FIG. 4 illustrates another example how to process the received reference signals to, using time of arrival as a characteristics to measure for positioning, without limiting the example to said characteristics. It is a straightforward measure for one skilled in the art to implement the described principles to other channel characteristics for positioning, for example to angle of arrival.

Referring to FIG. 4, assistance data is received in block 401 from the location management point, and using the assistance data, a transmit sequence matrix is generated in block 402 and an autocorrelation of the transmit sequence matrix (a combination of the transmit sequence matrix) is generated in block 403, for example as described above with blocks 302 and 303. The receive filter response is determined in block 404, and the transmit filter response is obtained in block 405, as described above with blocks 304 and 305. Then a combined filter response matrix is generated in block 406 by convolving the receive filter response and the transmit filter response. Further, a projection matrix is generated in block 407 from the autocorrelation of the transmit sequence matrix and the combined filter response matrix, for example by multiplying the matrices.

When reference signals are received (not separately illustrated) they are measured by sampling them in block 408 into time-domain samples, as described above with block 307. Then the time-domain samples are mapped in block 409 to delay-domain using the projection matrix. Channel is estimated in block 410 using the thus obtained delay domain, the combined filter response matrix and the autocorrelation of the transmit sequence matrix, for example using the equation 12 to have estimates on channel impulse responses.

A value of the at least one channel characteristics, i.e. in the example the value of the time of arrival, is then determined in block 411 based on the thus obtained estimation of the channel. For example, an envelope of the channel impulse responses may be analyzed, using the equations 14 and 15.

Figure 5:
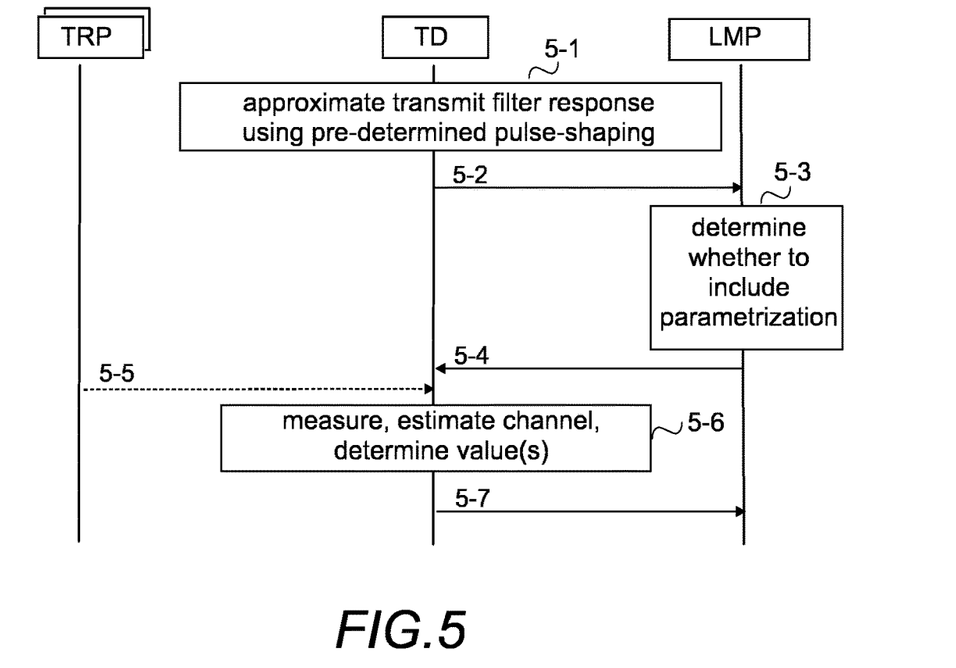
FIG. 5 illustrates an example of information exchange.

FIG. 5 describes an example of information exchange in view of a terminal device (TD) to be positioned. It should be appreciated that a transmission-reception point (TRP) may be configured to perform the same functionality, and the terminal device to transmit reference signals.

Referring to FIG. 5, in the illustrated example, the terminal device TD obtains in block 501 the transmit filter response by approximating the transmit filter response. In other words, the transmit filter response is an approximate of the transmit filter response, obtained (block 501) by using a predetermined pulse-shaping. For example, the pulse-shaping may be determined to be square root raised cosine filter, approximated in block 501 using following:

$$\hat{p}_t(t) = \begin{cases} \frac{1}{T}\left(1 + \beta\left(\frac{4}{\pi} - 1\right)\right), & t = 0 \\ \frac{\beta}{T\sqrt{2}}\left(\left(1 + \frac{2}{\pi}\right)\sin\left(\frac{\pi}{4\beta}\right) + \left(1 - \frac{2}{\pi}\right)\cos\left(\frac{\pi}{4\beta}\right)\right), & |t| = \frac{T}{4\beta} \\ \frac{\pi t}{T}\left(1 - \left(\frac{4\beta t}{T}\right)^2\right), & t \in (0\ aT] - \left\{\frac{T}{4\beta}\right\} \end{cases}$$

wherein
$\beta$ is a preselected roll-off, $\beta \in [0, 1]$,
T is symbol duration,
$\alpha \geq 1$,
aT is length.

Further, in the illustrated example, the terminal device is configured to send the location management point LMP message 5-2.

In an implementation, message 5-2 may contain information, for example a radio resource control connected flag, which indicates to the LMP the terminal device's capability to approximate the transmit filter response. In the implementation, message 5-2 may be sent before performing block 5-1, or when block 5-1 is being performed, or after block 5-1 has been performed. In another implementation, the information may be parametrization of the approximated filter response, in which case message 5-2 may be sent after block 5-1 has been performed.

It should be appreciated that in the example, if the terminal device TD is not configured to approximate the transmit filter response, i.e. no block 5-1 is performed, message 5-2 may indicate that, or no message 5-2 is transmitted.

In the illustrated example, the location management point LMP is configured to use in block 5-3 the information received in message 5-2 (or if no message 5-2 is received, information that no message 5-2 is received) to determine whether or not to include to the assistance data the parametrization of the transmit filter response. In one implementation, if message 5-2 contains the approximated parametrization, the location management point LMP may compare in block 5-3 the approximated parametrization to its parametrization of the transmit filter response and if the parametrizations are similar enough, not to include the parametrization. In another implementation, if message 5-2 indicates that the terminal device is capable to approximate the transmit filter response, the location management point LMP determines in block 5-3 not to include the parametrization to the assistance data.

Then the LMP transmits the assistance data (message 5-4), either with or without the parameterization, to the terminal device TD. When the terminal device receives from transmission-reception points reference signal(s) (message 5-5), the terminal device measures in block 5-6 the reference signal(s), estimates in block 5-6 corresponding channel(s) and determines in block 5-6 one or more values, as described above with FIGS. 3 and 4. Further, in the illustrated example, the terminal device reports the one or more values to the location management point by transmitting message 5-7.

However, it should be appreciated that in other implementations in which block 5-1 is performed, no information is transmitted to the location management point, i.e. no message 5-2 is transmitted, and hence no block 5-3 may be performed. In a further implementation no approximation is performed, and the implementation includes messages 5-4, 5-5, 5-7 and block 5-6.

As can see from the above examples, in addition to increasing positioning accuracy, also amplitude and phase estimation of a wireless multipath component is improved.

The blocks, related functions, and information exchanges described above by means of FIGS. 2 to 5 are in no absolute chronological order, and some of them may be performed simultaneously or in an order differing from the given one. Other functions can also be executed between them or within them, and other information may be transmitted, and/or other rules applied or selected. Some of the blocks or part of the blocks or one or more pieces of information can also be left out or replaced by a corresponding block or part of the block or one or more pieces of information.

Figure 6:
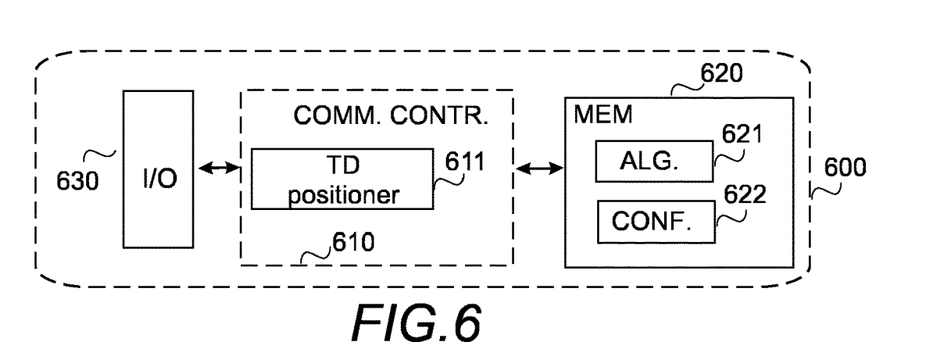
FIGS. 6 and 7 are schematic block diagrams.
Figure 7:
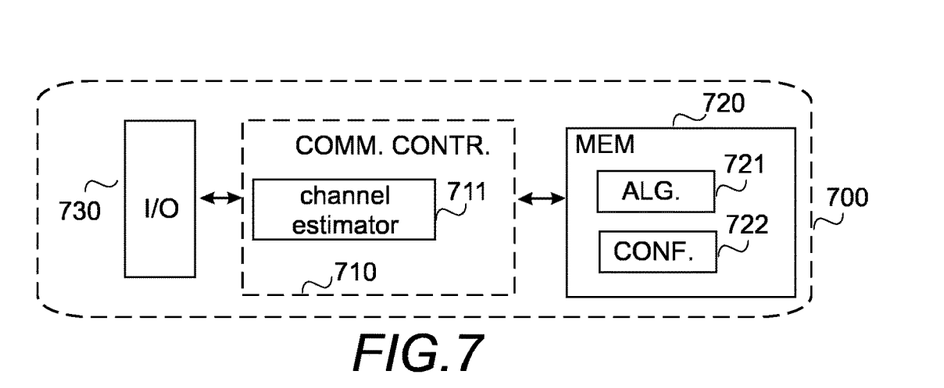

FIGS. 6 and 7 illustrate apparatuses comprising a communication controller 610, 710 such as at least one processor or processing circuitry, and at least one memory 620, 720 including a computer program code (software, algorithm) ALG. 621, 721, wherein the at least one memory and the computer program code (software, algorithm) are configured, with the at least one processor, to cause the respective apparatus to carry out any one of the embodiments, examples and implementations described above. FIG. 6 illustrates an apparatus, for example a network apparatus or a user equipment, configured to provide location management point (location management function), or any corresponding apparatus, suitable for positioning terminal devices and for providing assistance data to apparatuses of FIG. 7 for measuring and reporting, and FIG. 7 illustrates an apparatus, for example user equipment, or terminal device in a vehicle, or a transmission-reception point, to measure reference signals as configured by apparatus of FIG. 6, by further taking into account combined filter responses. The apparatuses of FIGS. 6 and 7 may be electronic devices, examples being listed above with FIGS. 1 and 2. It should be appreciated that an apparatus may be a combination of the apparatuses in FIGS. 6 and 7.

Referring to FIGS. 6 and 7, the memory 620, 720 may be implemented using any suitable data storage technology, such as semiconductor based memory devices, flash memory, magnetic memory devices and systems, optical memory devices and systems, fixed memory and removable memory. The memory may comprise a configuration storage CONF. 621, 721, such as a configuration database, for example for storing at least temporarily measurement and report configurations and/or filter responses and/or parametrizations. The memory 620, 720 may further store other data, such as a data buffer for data waiting to be processed (including transmission).

Referring to FIG. 6, the apparatus, for example network apparatus comprising a location management function, comprises a communication interface 630 comprising hardware and/or software for realizing communication connectivity according to one or more wireless and/or wired communication protocols. The communication interface 630 may provide the apparatus with radio communication capabilities with terminal devices, for example with the apparatus of FIG. 7, and transmission-reception points, as well as communication capabilities towards different location management services.

Digital signal processing regarding transmission and reception of signals may be performed in a communication controller 610. The communication interface may comprise standard well-known components such as an amplifier, filter, frequency-converter, (de)modulator, and encoder/decoder circuitries and, in case wireless communication is supported, one or more antennas.

The communication controller 610 comprises a device positioning circuitry 611 (TD positioner) configured to provide at least assistance data according to any one of the embodiments/examples/implementations described above. The device positioning circuitry 611 may further be configured to position terminal devices using information received in measurement reports. The communication controller 610 may control the device positioning circuitry 611.

In an embodiment, at least some of the functionalities of the apparatus of FIG. 6 may be shared between two physically separate devices, forming one operational entity. Therefore, the apparatus may be seen to depict the operational entity comprising one or more physically separate devices for executing at least some of the processes described with the network apparatus.

Referring to FIG. 7, the apparatus 700 may further comprise a communication interface 730 comprising hardware and/or software for realizing communication connectivity according to one or more communication protocols. The communication interface 730 may provide the apparatus 700 with communication capabilities with the apparatus of FIG. 6 and communication capabilities with one or more wireless access networks, for example with transmission-reception points and/or terminal devices. The communication interface may comprise standard well-known analog components such as an amplifier, filter, frequency-converter and circuitries, conversion circuitries transforming signals between analog and digital domains, and one or more antennas. Digital signal processing regarding transmission and reception of signals may be performed in a communication controller 710.

The communication controller 710 comprises a channel estimator circuitry 711 configured to measure reference signal transmissions and determine values of one or more channel characteristics according to any one of the embodiments/examples/implementations described above. The communication controller 710 may control the spatial distribution measurement circuitry 711.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 2 to 5 may be carried out by an apparatus comprising corresponding means for carrying out at least some of the described processes. The apparatus may comprise separate means for separate phases of a process, or means may perform several phases or the whole process. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments/examples/implementations described herein.

According to yet another embodiment, the apparatus carrying out the embodiments/examples comprises a circuitry including at least one processor and at least one memory including computer program code. When activated, the circuitry causes the apparatus to perform at least some of the functionalities according to any one of the embodiments/examples/implementations of FIGS. 2 to 5, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the apparatuses (nodes) described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments/examples/implementations as described may also be carried out in the form of a computer process defined by a computer program or portions thereof. Embodiments of the methods described in connection with FIGS. 2 to 5 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

The invention claimed is:

1. An apparatus comprising at least one processor; and
   at least one memory storing instructions that, when executed by the at least one processor, cause the apparatus at least to perform:
   receiving, by the apparatus, assistance data for positioning the apparatus, the assistance data indicating reference signals to be transmitted by a second apparatus that are to be measured and at least one channel characteristics whose value is to be determined for positioning;
   generating, using the assistance data, a transmit sequence;
   generating a combination of the transmit sequence by combining the transmit sequence with a corresponding received signal or by autocorrelating the transmit sequence;
   determining a receive filter response;
   obtaining a transmit filter response of the second apparatus;
   generating a combined filter response using the receive filter response and the transmit filter response;
   measuring reference signals received over a channel by sampling them into a plurality of time-domain samples;
   estimating the channel from the plurality of time-domain samples using the combined filter response and the combination of the transmit sequence; and
   determining, per channel characteristics of the at least one channel characteristics, a value of the channel characteristics based on the channel estimated.

2. The apparatus of claim 1, wherein the at least one memory and the instructions are further configured to, when executed by the at least one processor, cause the apparatus at least to perform:
   obtaining the transmit filter response by receiving its parameterization in the assistance data.

3. The apparatus of claim 1, wherein the at least one memory and the instructions are further configured to, when executed by the at least one processor, cause the apparatus at least to perform:
   obtaining the transmit filter response by approximating the transmit filter response using a predetermined pulse-shaping.

4. The first apparatus of claim 3, wherein the at least one memory and the instructions are further configured to, when executed by the at least one processor, cause the apparatus at least to perform:
  causing transmitting information on capability to approximate the transmit filter response to a location management point wherefrom the assistance data is received.

5. The apparatus of claim 4, wherein the information is transmitted using a radio resource control connected flag.

6. The apparatus of claim 3, wherein the at least one memory and the instructions are further configured to, when executed by the at least one processor, cause the apparatus at least to perform:
  causing transmitting a parametrization of the transmit filter response to a location management point wherefrom the assistance data is received.

7. The apparatus of claim 1, wherein the combination of the transmit sequence is a combination of the transmit sequence matrix, the combined filter response is a combined filter response matrix, and the at least one memory and the instructions are further configured to, when executed by the at least one processor, cause the apparatus at least to perform:
  generating a projection matrix from the combination of the transmit sequence matrix and the combined filter response matrix;
  mapping the time-domain samples to delay domain channel impulse responses using the projection matrix; and
  estimating the channel by using the delay domain channel impulse responses, the combined filter response matrix and the combination of the transmit sequence matrix.

8. The apparatus of claim 1, wherein the at least one memory and the instructions are further configured to, when executed by the at least one processor, cause the apparatus at least to perform:
  receiving the assistance data from a location management point; and
  causing transmitting the value to the location management point.

9. The apparatus of claim 1, wherein the at least one channel characteristics comprises time of arrival and/or angle of arrival, and/or relative time of arrival.

10. The apparatus of claim 1, wherein the apparatus is a transmission-reception point or a terminal device.

11. A method comprising:
  receiving, by an apparatus, assistance data for positioning the apparatus, the assistance data indicating reference signals to be transmitted by a second apparatus that are to be measured and at least one channel characteristics whose value is to be determined for positioning;
  generating, using the assistance data, a transmit sequence;
  generating a combination of the transmit sequence by combining the transmit sequence with a corresponding received signal or by autocorrelating the transmit sequence;
  determining a receive filter response;
  obtaining a transmit filter response of the second apparatus;
  generating a combined filter response using the receive filter response and the transmit filter response;
  measuring reference signals received over a channel by sampling them into a plurality of time-domain samples;
  estimating the channel from the plurality of time-domain samples using the combined filter response and the combination of the transmit sequence; and
  determining, per channel characteristics of the at least one channel characteristics, a value of the channel characteristics based on the channel estimated.

12. The method of claim 11, wherein the method comprises further:
  obtaining the transmit filter response by receiving its parameterization in the assistance data.

13. The method of claim 11, wherein the method comprises further:
  obtaining the transmit filter response by approximating the transmit filter response using a predetermined pulse-shaping.

14. The method of claim 13, wherein the method comprises further:
  causing transmitting information on capability to approximate the transmit filter response to a location management point wherefrom the assistance data is received.

15. The method of claim 14, wherein the information is transmitted using a radio resource control connected flag.

16. The method of claim 13, wherein the method comprises further:
  causing transmitting a parametrization of the transmit filter response to a location management point wherefrom the assistance data is received.

17. The method of claim 11, wherein the combination of the transmit sequence is a combination of the transmit sequence matrix, the combined filter response is a combined filter response matrix, and the method comprises further:
  generating a projection matrix from the combination of the transmit sequence matrix and the combined filter response matrix;
  mapping the time-domain samples to delay domain channel impulse responses using the projection matrix; and
  estimating the channel by using the delay domain channel impulse responses, the combined filter response matrix and the combination of the transmit sequence matrix.

18. A non-transitory computer readable medium comprising program instructions that, when executed by an apparatus, cause the apparatus to perform at least the following:
  generating, using assistance data received, by the apparatus, for positioning the apparatus, the assistance data indicating reference signals to be transmitted by a second apparatus that are to be measured and at least one channel characteristics whose value is to be determined for positioning, a transmit sequence;
  generating a combination of the transmit sequence by combining the transmit sequence with a corresponding received signal or by autocorrelating the transmit sequence;
  determining a receive filter response;
  obtaining a transmit filter response of the second apparatus;
  generating a combined filter response using the receive filter response and the transmit filter response;
  measuring reference signals received over a channel by sampling them into a plurality of time-domain samples;
  estimating the channel from the plurality of time-domain samples using the combined filter response and the combination of the transmit sequence; and
  determining, per channel characteristics of the at least one channel characteristics, a value of the channel characteristics based on the channel estimated.

19. A system comprising:
  at least one location management point configured to transmit assistance data for positioning, the assistance data indicating reference signals to be measured and at least one channel characteristics whose value is to be determined for positioning;

at least one apparatus to be positioned; and at least one second apparatus configured to transmit the reference signals;

wherein the at least one apparatus is configured to:

generate, using received assistance data, a transmit sequence;

generate a combination of the transmit sequence by combining the transmit sequence with a corresponding received signal or by autocorrelating the transmit sequence;

determine a receive filter response;

obtain a transmit filter response of the second apparatus;

generate a combined filter response using the receive filter response and the transmit filter response;

measure reference signals received over a channel by sampling them into a plurality of time-domain samples;

estimate the channel from the plurality of time-domain samples using the combined filter response and the combination of the transmit sequence; and determine, per channel characteristics of the at least one channel characteristics, a value of the channel characteristics based on the channel estimated.

20. The system of claim 19, wherein at least one of the at least one apparatus is further configured to obtain the transmit filter response by approximating the transmit filter response using a predetermined pulse-shaping, and to transmit information on capability to approximate the transmit filter response to at least one of the at least one location management point; and the at least one location management point is configured to use the information to determine whether or not to include transmit filter parametrization in the assistance data to be transmitted.

* * * * *

UNITED STATES PATENT AND TRADEMARK OFFICE
CERTIFICATE OF CORRECTION

PATENT NO. : 12,170,585 B2
APPLICATION NO. : 18/060919
DATED : December 17, 2024
INVENTOR(S) : Oana-Elena Barbu et al.

Page 1 of 1

It is certified that error appears in the above-identified patent and that said Letters Patent is hereby corrected as shown below:

In the Claims

In Column 19, Line 1, Claim 4, delete "first apparatus" and insert -- apparatus --, therefor.

Signed and Sealed this
Twenty-fifth Day of February, 2025

Coke Morgan Stewart
*Acting Director of the United States Patent and Trademark Office*